July 16, 1940.  F. L. SHELOR  2,208,282
SERVOMOTOR APPARATUS
Filed Feb. 10, 1937   5 Sheets-Sheet 3
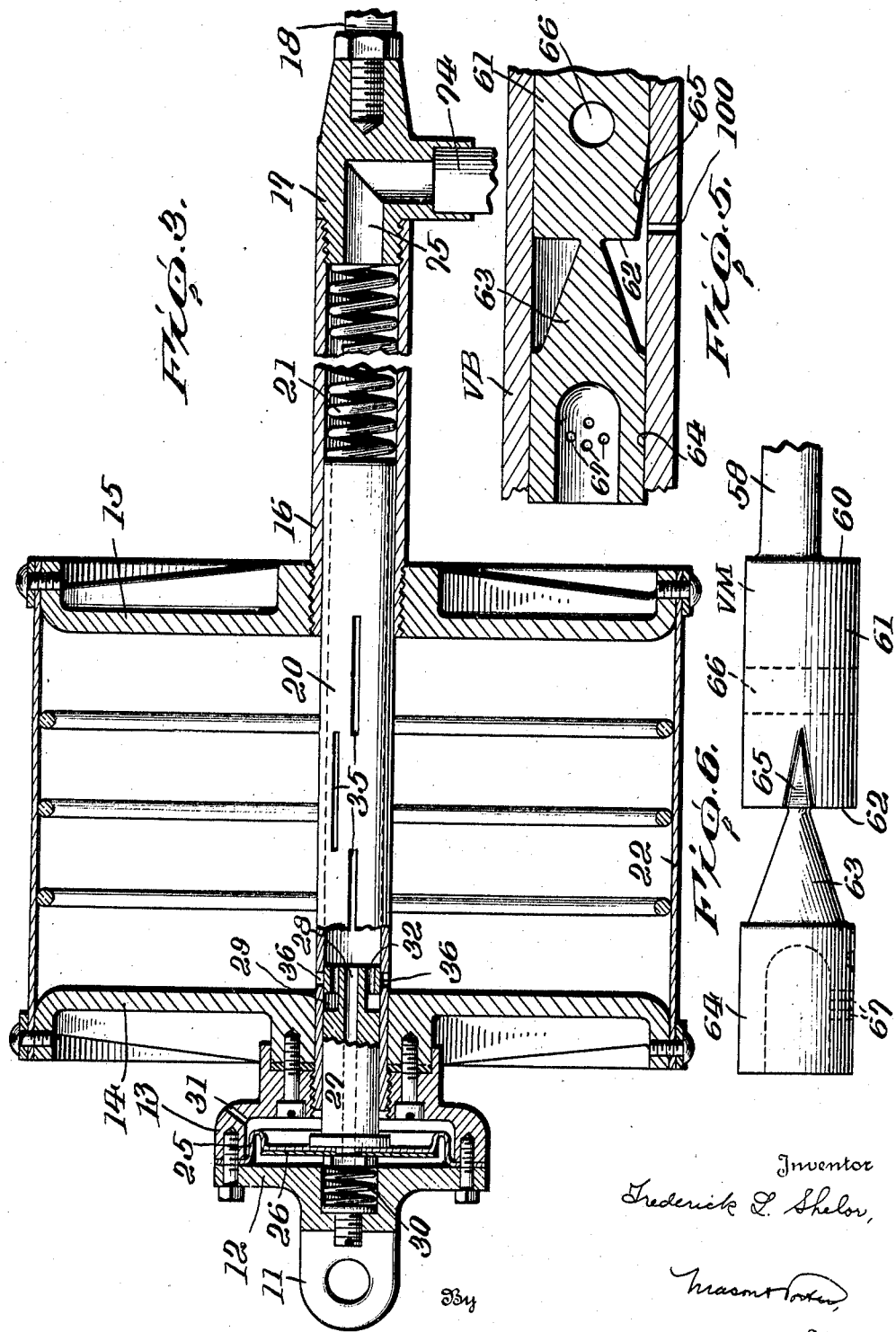
Inventor
Frederick L. Shelor,
By Mason & Porter
Attorneys

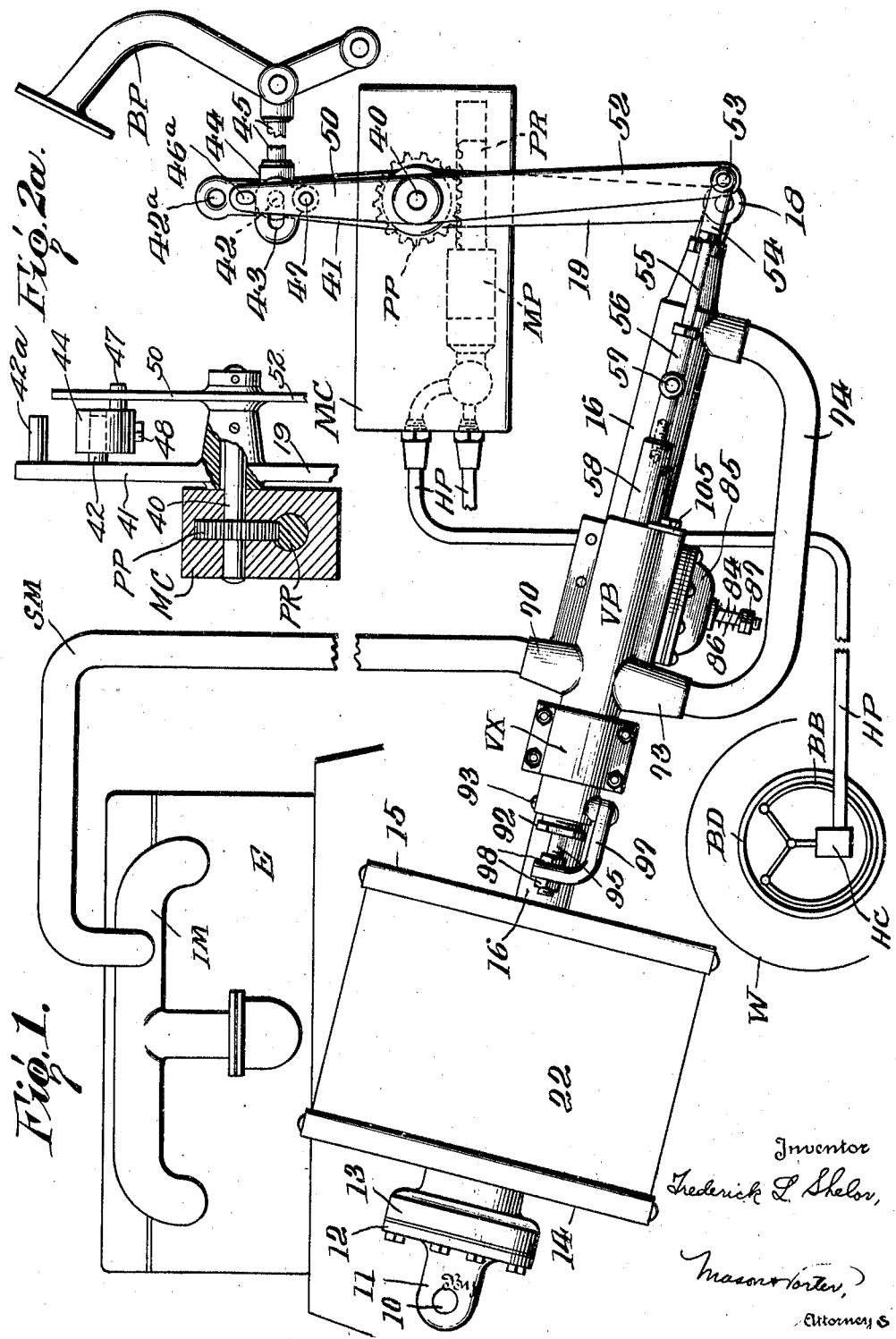

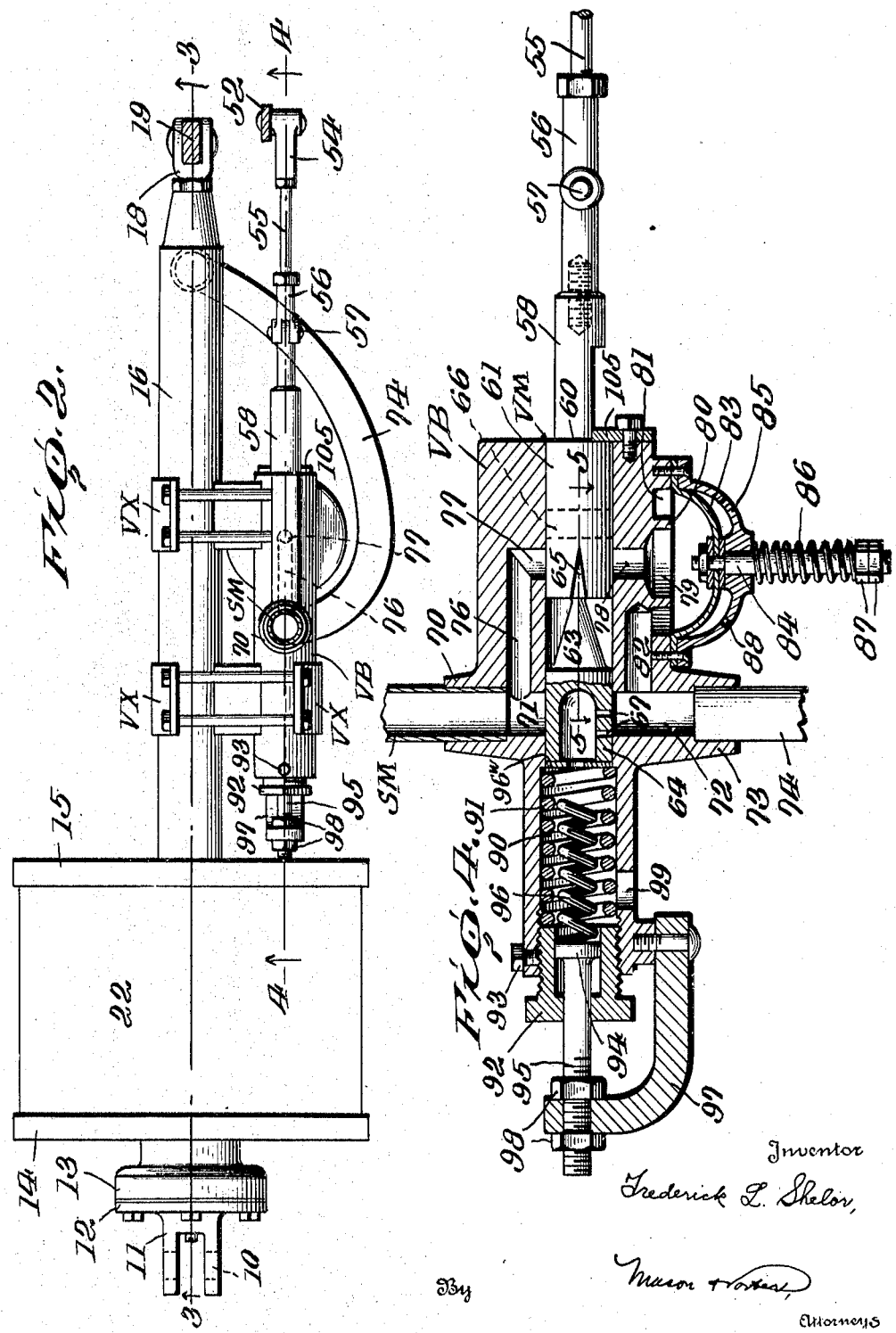

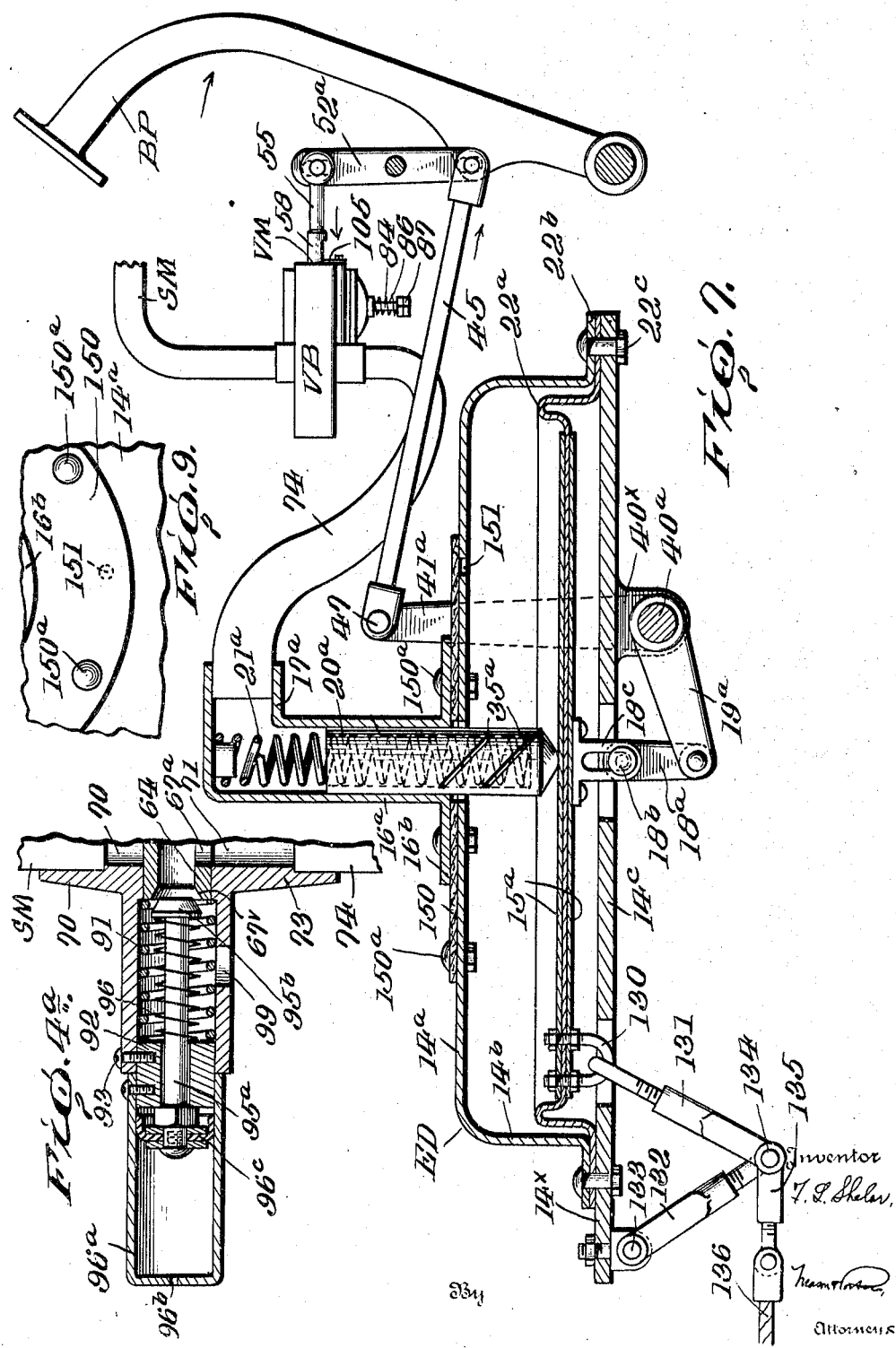

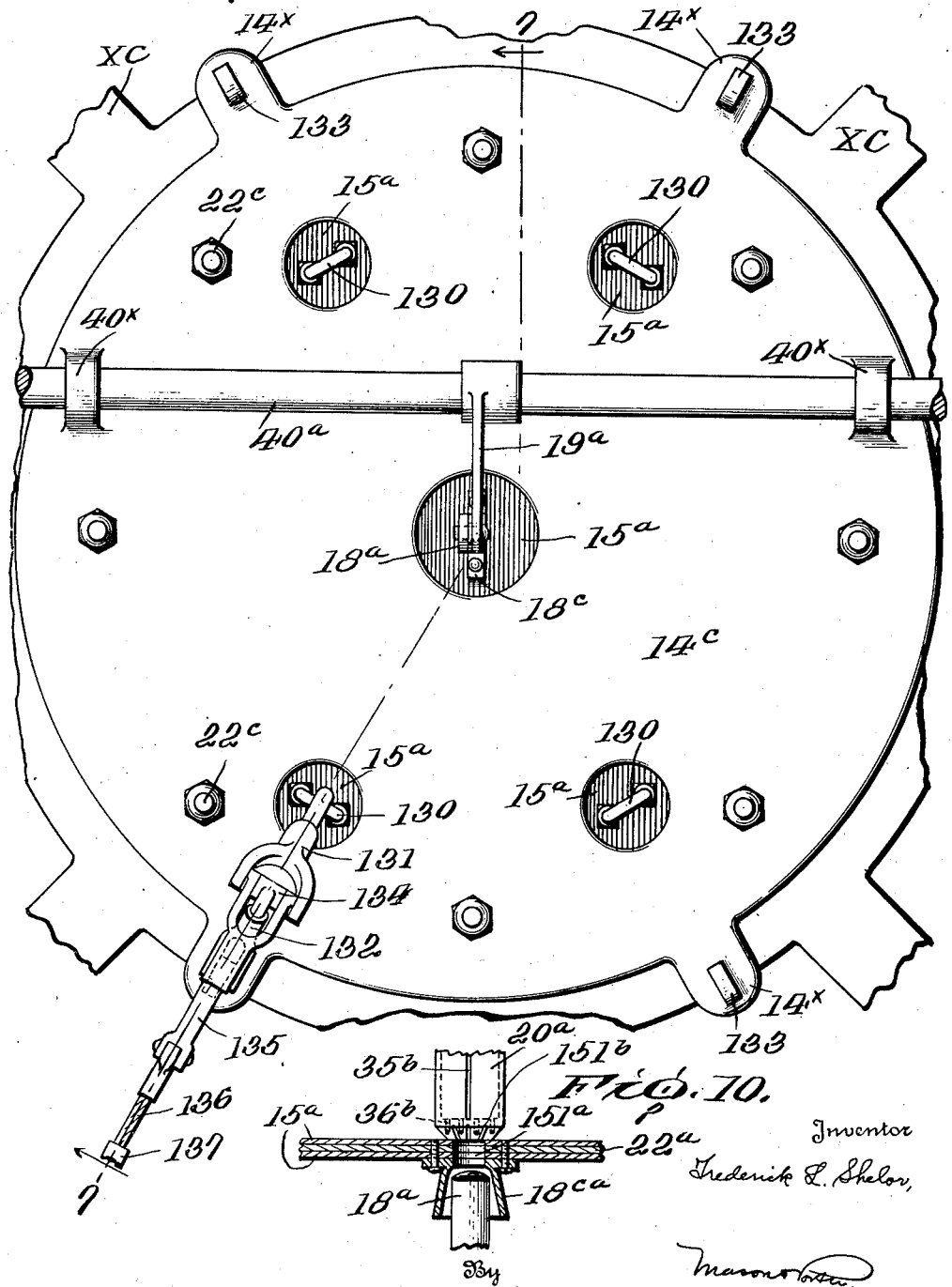

Patented July 16, 1940

2,208,282

UNITED STATES PATENT OFFICE 2,208,282

SERVOMOTOR APPARATUS

Frederick L. Shelor, Sandston, Va., assignor to Innovation Brakes, Inc., Richmond, Va., a corporation of Virginia Application February 10, 1937, Serial No. 125,127

18 Claims. (Cl. 188—152)

This invention relates to improvements in servomotor apparatus, which illustratively is employed as a power-actuated device, under control of a pedal or other manual device, for determining the actuation of vehicle brakes.

One of the features of the present invention is the provision of a simple and easily assembled structure for effecting the application of a brake or the like, and including a servomotor and means actuated with the servomotor for governing the energization thereof, together with a manual device for determining the extent of such actuation.

Another feature of the present invention is the provision of such a mechanism for incorporation with existing hydraulic brake structures, as a means for effecting the compression required for brake application.

A further feature of the present invention is the provision, in a power-actuated brake, of means actuated by the mechanism for controlling the degree of brake application effected.

Still another feature of the present invention is the provision of means for accomplishing quickly a take-up or light brake application, followed by a service application of the desired amount.

A still further feature of the present invention is the provision of means for regulating the supply of energizing medium to the servomotor, in proportion to the degree of movement of such mechanism.

With these and other features as objects in view, illustrative forms of practicing the invention are set out on the accompanying drawings, in which:

Figure 1 is a side elevation, showing the general assembly of the structure in association with a conventional hydraulic brake system for an automotive vehicle.

Fig. 2 is a plan view corresponding to Fig. 1.

Figure 2a is an upright elevation view showing the association of the pedal link, the brake lever, and the valve actuating lever.

Fig. 3 is an upright sectional view on a larger scale, substantially on line 3—3 of Fig. 2, of the servomotor mechanism.

Fig. 4 is a corresponding section, substantially on line 4—4 of Fig. 2, of a control valve.

Fig. 4a is a view corresponding to a portion of Fig. 4 but showing a modification of the control valve structure thereof.

Fig. 5 is a horizontal section through a part of the control valve assembly, on a yet larger scale and substantially on line 5—5 of Fig. 4.

Fig. 6 is a side elevation of the sliding member for the controlling valve.

Fig. 7 is an upright sectional view through a modified form of construction.

Fig. 8 is a bottom plan view of the structure shown in Fig. 7.

Fig. 9 is a top plan view of a fragment from Fig. 7.

Fig. 10 is a view corresponding to a portion of Fig. 7, but showing a modification of the mechanical and fluid-controlling structures thereof.

In these drawings, the parts of the automotive vehicle are shown conventionally, and out of proportion to one another and to other parts of the mechanism as disclosed. The automotive device is illustrated as having an engine E with an intake manifold IM having a conduit connection SM leading therefrom and providing a source of vacuum, so to speak, and acting to move the fluid energizing medium by which the servomotor is actuated in the form illustrated in Figs. 1 to 4.

Likewise, this vehicle is illustrated as having a wheel W with a brake drum BD having a brake band BB therein, this band being applied to the brake drum BD upon energization of a hydraulic cylinder HC which is supplied through a hydraulic pipe connection HP. A conventional type of hydraulic master cylinder MC is provided with a manifold for the pipes HP leading to the several braking devices, this manifold being supplied with liquid under pressure by actuation of a hydraulic piston MP provided with a piston rod formed as a rack PR, which in turn is actuated by the means described hereinafter.

Further, the automotive vehicle is provided with a brake pedal BP, which is provided as the means by which the driver is able to determine the time and degree of brake application.

According to the present illustration, a servomotor structure is energized by the vacuum produced through the conduit SM. This servomotor structure is connected at one end to a pin 10 on the vehicle frame, by an end piece 11 having a flange 12 which is bolted to a hollow member 13 which is connected fixedly with one part of an expansible chamber device, which in the form shown in Figs. 1 to 4 comprises the head piece 14 of a bellows which is collapsed when evacuated. Another part of the expansible chamber device, being the other head piece 15, is connected with the mechanism for applying the brake, as will be described hereinafter. Structurally, the head piece 15 is fixedly secured to a sleeve 16 having a hollow end member 17 provided with an eye-connection 18 by which it is attached to the brake lever 19.

The two head pieces 14, 15 are held in guided relation with one another by means of a tube 20 which is fixedly connected to the hollow member 13, so that it moves with the head piece 14. This tube 20 has a close sliding fit in the sleeve 16, and bears against a spring 21, reacting against the end member 17, and serving to normally hold the two head pieces 14, 15 at maximum extension. The head pieces 14, 15 are joined by a bellows 22 which is sealed to them and forms therewith the aforesaid expansible chamber device. The diameters of the head pieces are designed to give an appropriate pressure effect upon the employment of a proper predetermined maximum vacuum in the expansible chamber.

Within the hollow member 13 is a pilot diaphragm 25 having a stiffening plate 26. The diaphragm 25 is clamped between the flange 12 and the edge of the hollow member 13 so that the chamber formed at the left-hand end thereof is sealed to the atmosphere. A valve plunger 27 is slidable in but forms a tight fit with the tube 20. It has an axial passage 28 from end to end, and a peripheral passage 29 adjacent the inner end. At the outer end, it is tightly secured to the diaphragm 25 and its plate 26. A coil spring 30 tends constantly to hold the diaphragm and the valve in a right-hand position, this spring 30 being counteracted by suction effects transmitted through the passage 28 into the chamber at the left-hand side (Fig. 3) of the diaphragm 25. An atmospheric connection 31 leads to the right-hand chamber. Between the annular space 29 and the general interior of the tube 20, the body of valve 27 is provided with a plurality of openings 32.

In this preferred form, the tube 20 is formed with slots 35 by which suction effects may be transferred from the interior of the tube 20 to the annular space comprising the aforesaid expansible chamber; and each two adjacent slots, along the length of the tube, terminate substantially at the same radial plane. This type of construction is preferred for the tube, as it avoids the weakening which would occur if a single long slot were employed. In addition to the slots, the tube is also provided with large openings 36 which are normally closed by the right-hand end portion of the valve body 27, but which are aligned with the peripheral passage 29 thereof, when the valve body 27 is moved to its right-hand position.

The brake lever 19 is fixed to the brake shaft 40 which in turn is fixed to the pinion PP. Hence, when the eye-connection 18 is moved toward the left in Figs. 1, 2 and 3, the brake lever 19 turns in a clockwise direction, the hydraulic master piston MP is moved toward the left, and pressure is exerted through the hydraulic conduits HP and the brakes are energized.

The brake lever 19 has an upward extension 41 which is provided with a pin 42. This pin 42 is received in the slot 43 of the head member 44 of a pedal connection link 45 (Fig. 1), this head member 44 also having an eye for receiving a pin 47 which is secured in the head member 44 by a set screw 48. The pin 47 projects laterally and engages in an opening at the upper end of the valve actuating lever 50, this lever having a bearing loosely fitting around the extended end of the shaft 40, and having a lower arm 52 which engages by a pivot 53 with the end member 54 of a brake actuating link 55 which also comprises a second head member 56 connected by a pivot pin 57 with the metering valve structure 58, as will be described hereinafter.

Since different automative vehicles require different pressures in the braking systems, it is preferred to provide the upper end 41 of the brake lever with a second pin 42a at a greater radial distance from the axis of shaft 40. The head member 44 may be mounted on this upper pin 42a, in which case the pin 47 is then received in an upper aperture 46a on the upper end of the valve actuating lever 50.

As shown in Figs. 1, 2, 4, 5 and 6, the automatic control valve has a body VB and a sliding control member VM (Fig. 6). The valve body VB is fixedly attached to the sleeve 16 by the clamp pieces VX. This sliding member VM has the connection portion 58, a shoulder 60, a guide portion 61 which forms a close sliding fit in a corresponding shaped passage of the body VB, and providing a second shoulder 62; a conical portion 63 having its smaller diameter connected to the guide portion 61; and a second cylindrical guide portion 64 connected to the larger diameter of the conical portion 63. A flat 65 is formed on the cylindrical portion 61, this flat being of substantially triangular shape in area, with the apex at the right in Figs. 4, 5 and 6. This cylindrical portion 61 also has a transverse passage 66. The conical portion 63 has its major diameter somewhat smaller than the diameter of the cylindrical portion 64, so that there is an abrupt transition from the sealed condition prevailing when the cylindrical portion 64 operates as a closure member, as described hereinafter, when the brake is fully released, and the condition at which the cylindrical member 64 has just left this sealing position. The cylindrical member 64 has a hollow therein which is open at the left-hand end of the sliding member VM, and has a number of apertures 67.

The valve body is provided with a connection 70 which is in communication with the conduit SM by which the suction effect is transmitted to this automatic control valve. Within the valve body, this communication continues by a transverse bore comprising the holes 71, 72; the communication between the holes 71, 72 being closed, when the brake is released, by the cylindrical portion 64 of the sliding member. The hole 72 leads to a connection 73 which is in communication by the hose 74 with the passage 75 within the end member 17.

A branch passage 76 leads from the hole 71 to a port 77 which normally is closed by the cylindrical portion 61 of the sliding member VM. When the sliding member is moved to a left-hand position, the transverse passage 66 establishes communication between the port 77 and a diametrically opposite port 78. This port 78 is in communication with a chamber 79 defined by an annular valve seat 80. Surrounding this annular valve seat is an annular passage 81 communicating with a passage 82 forming a branch from the hole 72.

The valve seat 80 may be sealed by an automatic control diaphragm 83 having a plunger 84 which extends externally through a cover plate 85 and is provided with a coil spring 86 which normally tends to draw the diaphragm 83 into the open position shown in Fig. 4. The initial compression, and the effect, of the spring 86 may be adjusted by the control nut 87 which is threadedly engaged with the lower end of the plunger 84. Openings 88 establish communication between the space beneath the diaphragm 83 and the atmosphere.

The left-hand end of the valve body VB is formed with a cavity 90 into which the left-hand end of the sliding member VM may extend, this leftward movement of the sliding member VM being opposed by a first coil spring 91 which may have a slight initial pressure if desired, this being adjusted by the hollow reaction nut 92, which may be locked in place by the setscrew 93 after adjustment. A reaction head 94 on the stem 95 is provided for engagement by an inner second spring 96, this spring being wholly disengaged from the sliding member VM when the latter is in the non-braking or extreme right-hand position of the parts, and being engaged by a wear washer 96w, secured to the valve member VM, during movement of this valve member for controlling the rate of brake actuation.

The position of the reaction head 94 is controlled by adjusting it in the bracket 97 which is secured to the body VB: this adjustment being maintained by the lock nuts 98. An opening 99 allows the establishment of atmospheric pressure in the cavity 90.

The valve body VB is provided with a small bleeder hole 100 for cooperation with the space at the flat 65.

By construction, the parts of the valve body VB, the spring 96, and the parts of the sliding member VM are so proportioned that in the right-hand position (Fig. 4), with the shoulder 60 engaged against the stop member 105, the transverse passage 66 is out of alignment with the ports 77, 78; the hole 100 is at the base of the triangle flat 65; the cylindrical member 64 is within the cylindrical passage existing between hole 71 and port 77 so that the annular space around the conical member 63 is cut off both from the hole 71 and from the hole 72; the openings 67 are in free communication with the hole 72; and the second spring 96 is free of the sliding member VM. When the sliding member VM has been given a predetermined amount of sliding movement toward the left, the transverse passage 66 establishes communication between the ports 77 and 78. When the rate of flow thus established reaches a predetermined amount, as controlled by the action of the spring 86, then, by construction, the right-hand end of the cylindrical portion 64 is about to permit communication between the holes 71, 72 and the annular space about the conical portion 63; and also the left-hand end of the sliding member VM is beginning its engagement with the second valve spring 96. Since these are matters of construction of the sliding member VM, in association with the fixed position of holes and ports in the body VB, and the length of the spring 96, the adjustment comprises a regulation of the nut 87 so that the rate of flow through the transverse passage 66 causes a movement of the diaphragm 83 at the time when the other passages are being opened to assume control.

The operation of this structure is as follows:

When the brakes are fully released, and the engine is turning over, a suction effect is being produced through the supply conduit SM, so that the connection 70, the hole 71, and the passage 76 are under evacuation: but no flow is occurring as the hole 71 is closed off by the cylindrical portion 64, and the port 77 is closed by the cylindrical portion 61. Atmospheric air can enter the annular space about the conical portion 63, through the hole 100 and along the space provided by the flat 65. Atmospheric air can likewise enter through the hole 99 into the cavity 90, and pass into the hollow of the cylindrical portion 64 and thence through the holes 67 to the hole 72 and thence by connection 73, hose 74, end member 17, the tube 20, and holes 35, 36, as described hereinafter, into the expansible chamber aforesaid: and may also flow through the passage 28 into the chamber at the left-hand end of the diaphragm 25; so that the expansible chamber tends to extend to the position shown in Fig. 3, which is the normal position when the brake is not being applied. Further, the diaphragm 25 moves to its right-hand position, under the urgency of spring 30, so that the annular passage 29 is in communication with the large ports 36. The spreading or extension of the head pieces 14, 15, is effected or assisted by the spring 21.

The extension of the servomotor structure is accompanied by a rightward movement of the eye-connection 18, and a counterclockwise movement of the brake lever 19, so that the shaft 40 and pinion PP cause the piston MP of the hydraulic master cylinder to move toward the right, and therewith draw liquid from the hydraulic conduits HP, so that all of the brakes are released and moved to the extreme-released position. A definite amount of clockwise movement of the brake lever 19 is also accompanied by a taking up of slack in the lost motion connection between the walls of slot 43 and the pin 42, if such slack be present, and resulting in a restoration of the brake pedal BP, to the "off" position if it has not already attained such position. This movement of the head member 44 also represents a similar counterclockwise movement of the valve actuating lever 50, 52, and of the adjustable linkage 55 thereof, so that the sliding member VM is assured of remaining in the position shown in Fig. 4, with the shoulder 62 against the stop 105: the adjustment of the link 55 being accomplished with this end in view.

Furthermore, the passage of air into the hole 82 also permits air at atmospheric pressure to enter the annular passage 81, so that the spring 86 overcomes any existing suction effect above the diaphragm 83, and the latter moves into the lowermost position as shown.

In order to apply the brake, the pedal BP is pressed toward the right, so that the pedal lever moves in a clockwise direction, drawing the link 45 toward the right. The pin 47 then causes a clockwise movement of the valve actuating lever 52, and this in turn causes the sliding member VM to be moved leftward relative to the valve body VB. During the course of this leftward movement, the first change from the non-actuated condition, is the opening of a part of the area of the transverse passage 66 so that the suction effect in the supply conduit SM is transmitted by the branch passage 76, port 77, transverse passage 66, port 78, chamber 79, annular passage 81, branch passage 82, to hole 72. This leftward movement of the sliding member VM has also resulted in the closing off of some of the holes 67: so that a balance is now established, and a low evacuating effect is produced at the hole 72, which is transmitted by connection 73, hose 74, end member 17, into the tube 20, from which it reveals itself by drawing air through the slots 35, at a relatively low rate because of the relatively small total cross-sectional area of these slots, considered as ports, in comparison to the cross-sectional area of the larger ports 36. The suction in the tube 20 also causes a flow of air from the expansible chamber device through these larger ports 36 into the annular passage 29 and thence by the passages 32 into the interior of the tube 20. While the pressure-depression thus produced is small, there is substantially no resistance to the relative movement of the parts of the expansible chamber device, and hence a quick movement is imparted to the sleeve 16, so that the expansible chamber device, operating as a servomotor, causes a quick clockwise movement of the brake lever 19, and the shaft 40 and the pinion PP operate to move the piston MP toward the left and cause liquid pressure to be established in the hydraulic conduits HP, resulting in the movement of the brakes to "application" position. Since this is attended by little resistance, the slackness in the brakes is rapidly taken up until the bands encounter such a reaction effect from the brake drums that a back pressure effect is established along the aforesaid train, and the expansible chamber device comes to a standstill, as the prevailing pressure differential is not sufficient to cause a greater "setting" effect.

The movement of the sleeve 16 toward the left, resulting in the movement of the brake lever 19 as aforsaid, has also been accompanied by a movement of the valve body VB, attached to the sleeve 16, in a corresponding direction: so that, if the brake pedal BP be held in its first-moved position, a compensation is shortly effected, and a position of equilibrium is established.

With the continued pressure upon the brake pedal, however, the sliding member VM is moved further toward the left relative to the valve body VB, so that more and more of the cross-sectional areas at the ends of the transverse passage 66 become effective, and greater and greater evacuation effects are set up, owing to the greater suction occurring in correspondence to this increase of area, and also, inversely, by reason of closing off more and more of the cross-sectional area of atmospheric inlet provided at the holes 67. This increase represents a quicker initial application of the brakes, by the paths and means aforesaid. Ultimately, however, this suction effect exceeds the load imposed by the spring 86 upon the control diaphragm 83, so that this diaphragm rises and shuts off the chamber 79 from the annular passage 81. As stated above, this condition is attained when the sliding member VM has just engaged the second spring 96, and the cylindrical portion 64 is just ready to permit flow from hole 72 to hole 71. During the initial quick-take-up movement of the brake pedal, as described above, the reaction has essentially been produced by the action of the spring 91, which can be calibrated as desired.

When this particular pressure effect is attained, so that the diaphragm 83 closes as aforesaid, the diaphragm 25 is likewise energized, as the suction effect in the chamber at the left of this diaphragm now exceeds the adjusted force of the spring 30, so that the valve body 27 moves toward the left and closes the large ports 36.

A further movement of the pedal, from this position of initial take-up, is now accompanied by a greater resistance to such pedal movement, as the spring 96 must also be compressed. The movement of the sliding member VM now permits communication between holes 71 and 72, through the annular space around the conical member 63, this conical member therefore operating as a metering valve for controlling the rate of flow for a given pressure differential. At the same time, the hole 100 permits the entry of atmospheric air, at a rate coordinated inversely with the area exposed around the conical portion 63, so that there is effected a compensation for differing evacuation effects in the supply conduit SM, so that the pressures within the hole 72 and hose 74, and in the tube 20, remain substantially constant regardless of fluctuations of pressure at the engine manifold.

This pressure, however, is not transmitted freely to the expansible chamber device, but is again metered at the slots 35. As the right-hand head piece 15 moves toward the left-hand head piece 14, representing a reduction in the volume within the expansible chamber device, the slots 35 are cut off more and more. In the illustrated form, as the expansible chamber device is substantially cylindrical in shape, and the slots 35 are of uniform area per unit of length of the tube 20, the reduction in the port area, as afforded by the slots 35, varies substantially linearly with this volume. Hence, as the head pieces move relatively toward one another, the volume within the expansible chamber device decreases, and the cross-sectional area of the ports decreases in the same proportion. Hence, the rate of evacuation of the remaining volume decreases, and hence there is not an increase in the rate of movement of these head pieces, as would be the case were the area to remain constant. Thus, the device operates smoothly, and does not have a tendency to "overshoot" upon short pedal movements.

The movements of the brake lever 19 and of the valve actuating lever 52 are coordinated, as aforesaid. It is preferred to have the lost motion provided at the pin 42 and slot 43, of such extent that it substantially corresponds to the normal distance of movement required of the brake lever 19 to bring the brake bands from "off" position to a position in which they are about to exert a braking effect upon the corresponding brake drums, that is, the brake bands are "touching" the brake drums.

When the brakes have been applied, for a full or partial service application, by a corresponding movement of the brake pedal, a partial release of the pedal is accompanied immediately by a release of the sliding member VM so that this member can move relatively toward the right with respect to the valve body VB, thus cutting off the suction effect, in part or whole, at the conical portion 63, and permitting an increased atmospheric relief to occur at the hole 100, or through the holes 67, so that a partial or complete relief occurs in the expansible chamber device, along the path and by the means aforesaid. If the brake pedal is partly released, the extension or separation of the heads 14, 15 is followed by a movement of the sleeve 16 and therewith of the valve body VB, until a balancing again occurs for a particular relative position of the sliding member VM with respect to the valve body VB.

In the form of construction shown in Figs. 7 and 8, the brake pedal BP has a link 45 for engaging the pin 47 of a lever arm 41a which is rockable about a pivot 40a. In this form, a lever member 52a also is pivotally connected to the pedal BP, so that it is moved positively with the brake pedal BP; this lever 52a being connected by a link 55 with the control valve VM in the valve body VB; which may be fixed to the vehicle frame and is illustratively shown as of the same type as that utilized with the first form of construction, being connected by a supply conduit SM with a suitable means for evacuation, and being connected by a hose 74 with a suction end connection 17a of a servomotor structure.

This servomotor structure is illustratively shown as an expansible chamber device formed of a drum member ED comprised of an end wall 14a and a peripheral wall 14b: the drum member ED being fixedly secured in a suitable manner to a vehicle frame, for example, at the junction of an X-cross member of the frame, indicated generally at XC in Fig. 8. With this illustrative arrangement, the drum ED is mounted with a vertical axis, and with the wall 14a at the top.

A bellows diaphragm 22a is sealed at the open edge of the drum wall 14b by a flange 22b, a plate 14c, and suitable clamping means 22c, so that the space between the drum ED and the diaphragm provides an expansible chamber. The diaphragm is stiffened and supported by a pair of plates 15a providing therewith a stiff, universally movable head member. A hollow plunger 20a has a reduced lower end engaged with the head member, to permit rocking and sliding in respect of the upper plate 15a: while the flexible bellows 22a permits not only this rocking and sliding, but also the normal upward and downward movement of the plate 15a as the volume within the expansible chamber varies. The hollow plunger 20a is guided in a sleeve 16a which has a flange 16b fixedly secured to the end wall or head 14a of the drum ED, and is fixedly connected with the end connection 17a. A spring 21a is employed to exert a downward pressure upon the plunger 20a. This plunger 20a is apertured along its length, being provided with slots 35a by which fluid may flow relatively between the expansible chamber and the interior of the hollow plunger 20a: these slots being closed off more or less and to an extent determined by the portion of the plunger 20a which is within the sleeve 16a.

The flange 16b is utilized, in this illustrative form, to clamp the inner edge of an annular valve member 150, which is illustrated as being made of leather and being connected, at spaced points of its outer margin, with the underlying wall 14a by the bolts 150a; this outer margin being of greater radius than the apertures 151 which are provided in this wall 14a, so that the valve member 150 closes these apertures when the expansible chamber is at a pressure lower than that of atmosphere, but opens these apertures when the pressure within the chamber is greater than atmospheric. It will be noted (Fig. 9) that the bolts 150a are located intermediate the apertures 151.

The lever arm 41a is connected to the shaft 40a and thus to a crank arm 19a which is joined to a link 18a having a pin 18b received in a slotted connection piece 18c fixedly secured to the diaphragm 22a and plate 15a. The plate 14c is apertured at its center to permit free movement of these parts.

At points of the plates 15a which are spaced both from the center (at which is located the socket member 15b and the connection member 18b), and from one another, are provided a plurality of mechanical connection pieces 130, illustrated as U-bolts, each of which receives an eye on a corresponding link 131 which in turn is connected with an individual pivoting connection member 132 mounted by a pivot 133 on an extension 14x of the plate 14c of the drum ED. Each structure 131, 132 has a common pivot connection 134 by which a braking effort may be exerted, this illustratively being accomplished by the connecting element 135, the internal wire 136 of a Bowden cable having a sheath 137 and being connected by suitable means to the brake elements (not shown). For cheapness of construction and repair, the illustrated form of construction is shown as having the links, levers, and connections 131, 132 and 135 formed of shackle bolts, which have apertured bifurcations at one end of an internally threaded sleeve, and a shank portion having a thread for engagement with this sleeve and also having an eye for providing a pivot connection at the other end of the shackle bolt. The threaded engagement of the sleeve and shank permit adjustment of the distance between the end pivots. The plate 14c also has apertures for the connections 130 and the links 131.

In the illustrative form, as shown in Fig. 8, four such mechanical connection pieces 130 are provided. Only one of these pieces 130 is illustrated as connected in full to its corresponding Bowden cable, for simplicity of disclosure: but it will be understood that similar systems may be employed at the other connections 130.

From Fig. 8, further, it will be noted that the shaft 40a extends chordally across the drum ED and is supported by brackets 40x secured to the drum plate 14c.

In operation, a movement of the brake pedal BP is accompanied by a movement in the valve VM, substantially as described above, so that a suction effect is transmitted through the hose 74 and other parts of the conduit connection, to the slots 35a which form a port of variable area. Initially, the diaphragm 22a and its plates 15a are in a lowermost position, so that a maximum area of the slots 35a is exposed. Hence, evacuation of the expansible chamber occurs rapidly, and the connections 130 are drawn upward at a rapid rate. This is accompanied by a similar upward movement of the upper ends of the links 131. Since the levers 132 have a downward inclination while the brakes are "off," the links 131 in their rapid upward movement produce a swinging of the connection members 132 through considerable individual arcs, and thus the brake members are rapidly moved to position for initial application, thereby taking up any slackness in the individual connections. Since the plate or head 15a is capable of universal movement, the arrangement of the connections 130 results in a substantially uniform initial application. This initial rapid upward movement of the head 15a is permitted because very little resistance is opposed by the braking connections.

The decrease of volume of the expansible chamber results in an upward movement of the hollow plunger 20a, so that the slot 35a is reduced in effective area, substantially in proportion to the decrease in volume of the expansible chamber, with the advantages aforesaid of avoiding an excessively rapid movement of the bellows under such conditions.

A continued pressure upon the brake pedal BP results in a continued transfer of suction effects to the expansible chamber, and thus greater and greater pulls are exerted along the links 131 and thus greater and greater brake applications are effected, with an automatic balancing of braking pressures by the universally mounted head 15a. As the connection members 132 swing upward toward a relatively horizontal position, a change of trigonometric ratios occurs, and the angular movement of the levers per unit of upward movement of the corresponding connection 130 decreases. Thus, during the initial application, the upward movement of the plate 15a is accompanied by a relatively large movement of the individual wires 136: while at the end of the upward stroke of the plate 15a, a lesser relative movement of the wires 136 is produced. Since the upward movement is being effected by changes of pressure differential between the expansible chamber and the atmosphere, and the area upon which this pressure is being exerted remains substantially constant, it is obvious that greater braking effects are being produced at the requisite time for employing such greater forces.

In the event that the servomotor is not operative, for any reason, then the movement of the pedal BP produces through the aforesaid linkage and levers an upward movement of the thrust link 18a as before, this movement being transmitted by pin 18b and also by the engagement of the upper end of this link 18a directly to the connection piece 18c and thus to the diaphragm 22a and plates 15a. These plates 15a are preferably constructed so that they have strength as a lever, and hence are mechanically effective for producing upward movement of the connections 130 as before, with the corresponding application of the brakes: but it will be noted that this application of the brakes results from the force exerted by the driver of the vehicle directly upon the brake pedal BP. During such a movement, the diaphragm 22a produces a pressure within the expansible chamber which is above atmospheric, but this pressure is permitted to escape through the apertures 151 and past the valve 150 so that there is essentially no retardation of the braking movement, nor is excessive force required at the brake pedal BP.

By adjustment of the links 131 and 135, the pivot point 134 may be adjusted in an arc about the pivot 133, so that the aforesaid trigonometric ratio is modified: and a change in the length of the connection member 132 also produces a change. By adjustments of the individual chains of connections between a U-bolt 138 and a corresponding wire 136, it is possible to adjust the structure so that the requisite degree of pressure is attained at each of the connections: and different braking efforts can thus be exerted at the front wheels, for example, as compared with the efforts produced at the rear wheels. During this purely mechanical braking, it will be noted that the pin 18b serves as a guide member so that the force transmitted through the lever 41a, 19a is being exerted at a predetermined point of the plates 15a, regardless of the relative position assumed by the plates 15a with respect to the lower end of the plunger 20a or, in other words, the universal adjustability between the plunger 20a and the plates 15a is permitted during the normal operation of the servomotor, but without disturbing the capability of the parts of responding immediately and in proper braking proportion, if the servomotor fails. It will be noted that varying braking efforts are being produced during the course of brake-applying movements, during either manual or power applications.

In the modified form shown in Fig. 4a, the left-hand cylindrical portion 64 of the sliding valve member has its cavity terminated by a valve seat 67v. The outer or primary spring 91 reacts against the block 92 which may be adjusted and secured by the screw 93, but also receives a cylinder member 96a having a minute orifice 96b at its end and receiving the piston 96c which is connected to the slidable plunger rod 95a which is guided loosely in the block 92 and extends through the inner or secondary spring 96 and is provided with a valve head 95b for engagement with the valve seat 67v. With this arrangement, when the sliding valve member VM is moved toward the left, the initial effects of establishing a low suction to obtain the initial application of the brake elements, at the transverse passage 66, is effected as before. This initial movement finally terminates when the passage around the conical portion 63 permits direct communication between the holes 71 and 72: at which time, or just prior to which time, the sliding valve member VM has presented the valve seat 67v against the valve head 95b, thus completely shutting off the communication from atmosphere which has existed through opening 99, the internal space of the valve body extension, and the cavity within the cylindrical member 64, and through the orifice 67a, which has been gradually closing in proportion to the valve movement. Further, a continued movement of the sliding valve member places pressure upon the valve spring 96, and also causes the piston 96c to move toward the left, but without any essential restriction, as air can move around the flexible cup of this piston. When the valve member VM is permitted to move toward the right, however, the cylinder 96a and its piston 96c operate as a dashpot to detain the valve head 95b, while the sliding member VM can move freely. Hence, there is an immediate atmospheric connection prepared from the opening 99 to the hole 71, and thus a quick release can be effected. It will be noted that the dashpot permits the slow return of the valve head 95b toward the right, so that a partial quick release at the brake pedal will result in a quick release of the brakes, followed by a further application at a rate and intensity determined by the partial release movement and also by the effect of the dashpot.

In the form of construction shown in Fig. 10, the plunger 20a is illustrated as having a slot 35b along its length. The two plates 15a are connected with the diaphragm 22a, and with the connection piece 18ca which is illustrated as a bell-shaped guide having its peripheral wall extending downward and around the upper end of the link 18a which has provided thereon a valve closure surface for cooperation with the internal surface of the cup 18ca. The structure 15a, 22a is provided with an aperture 151a at a point such that it is normally covered by the lower end of the plunger 20a, but the lower end of this plunger is provided as shown with cross grooves 151b which permit a relatively slow flow of air relatively between the expansible chamber space and the passage 151a. In operation, when the brakes are released, the link 18a exposes the aperture 151a at the lower end thereof, but this aperture is closed at its upper end by the plunger 20a. When suction occurs above the diaphragm 22a, this diaphragm lifts and raises the plunger 20a in the manner described above: but any movement which occurs at a rate in excess of the movement of the link 18a mechanically from the pedal results in leakage through the passage 151a to limit the diaphragm movement: and hence the pedal movement is accurately reproduced by the diaphragm. When the pedal is released, the link 18a moves away from the lower end of the aperture 151a and thus permits a full or partial release of the brakes. In this form, further, the internal space of the plunger 20a is illustrated as connected by small axially directed holes 36b with the chamber space, to provide a small air flow even though the slot 35b is entirely shut off.

In both major forms of construction, it will be noted that the brake pedal BP is an initiating element and is effective for controlling the final pressures developed through the servomotor. In each instance, this braking pedal is illustrated as having a connection to the control member for determining the actuation of the servomotor: and also having a lost motion connection to the means by which the servomotor operates to exert its force, so that upon failure of the servomotor, the brake pedal by normal movements thereof becomes effective to apply the brakes or establish a force corresponding to that produced from the servomotor, without loss of time.

Further, in both forms, a change of port area is being accomplished, with an expansible chamber device, this change of port area being proportioned to the change of chamber volume.

It is obvious that the forms shown are presented merely as illustrations of the manner in which the invention may be employed: and that the same may be assembled and used in many other ways and for many other purposes, without departing from the scope of the appended claims.

I claim:

1. A servomotor apparatus comprising an expansible chamber device with two members moved relative to one another as the chamber volume varies, power-driven means for effecting movement of a fluid energizing medium, a control valve having two relatively movable parts cooperative in different moved positions to determine the energization of said chamber device, one of said parts being connected to one of said members to move therewith, a supervising control device connected to the other said part for effecting a movement of the same independently of the movement of said members, and conduit means connecting said power-driven means, control valve and chamber device, said conduit means having ports so constructed and arranged and cooperating with the members that they are reduced in effective area during the movement of said members toward one another.

2. A servomotor apparatus comprising an expansible chamber power device with two members moved relative to one another as the chamber volume varies, power-driven means for effecting movement of a fluid energizing medium, a control valve and conduit means connected with said power-driven means for determining the energization of said chamber device, said conduit means including a port for effecting communication with said chamber device, and means for varying the area of said port upon change of the chamber volume and at a rate dependent upon the rate of change of the chamber volume.

3. An apparatus as in claim 2, in which said means is constructed and arranged for varying the port area substantially in exact proportion to the variation of said volume.

4. An apparatus as in claim 2, in which the parts are constructed and arranged so that the said volume varies substantially in a predetermined ratio to the amount of relative movement of said two members, and the port area is varied substantially in exact proportion to the variation of said volume.

5. A servomotor apparatus comprising an expansible chamber device with two members moved relative to one another as the chamber volume varies, a control valve for controlling the flow of fluid into and out of the chamber, and conduit means between said valve and chamber, said conduit means including a tube along which one said member moves, said tube having a port along its length to establish communication between the chamber and the interior of the tube, said one member being effective in its movement to shut off said port to an extent determined by the amount of said movement.

6. A servomotor apparatus comprising an expansible chamber device with two members moved relative to one another as the chamber volume varies, the amount of such movement of the members being substantially proportionate to the variation of said volume, a control valve effective for transmitting evacuating effects to said chamber, and conduit means from said valve to said chamber including an elongated port, one of said members being effective to open and close said port more or less and in accordance with the direction and amount of such movement.

7. A servomotor apparatus comprising an expansible chamber device with two members moved relative to one another as the chamber volume varies, a control valve effective for transmitting evacuating effects to said chamber, conduit means from said valve to said chamber including a port of small area and a port of larger area, and means responsive to the pressure in said conduit means for closing said larger port.

8. An apparatus as in claim 7, in which said smaller port is elongated, and one of said members is effective to open and close said smaller port more or less and in accordance with the direction and amount of the relative movement of the two members.

9. A servomotor apparatus comprising an expansible chamber device with two members moved relative to one another as the chamber volume varies, a control valve effective for transmitting evacuating effects to said chamber and for determining the pressure differential in said chamber relative to atmospheric pressure, said control valve being constructed and arranged to cause said pressure differential to exceed a predetermined minimum whenever the valve is in open position, auxiliary valve means associated with the control valve and effective for producing an evacuation of the chamber to a pressure differential less than said minimum pressure differential, and means responsive to the pressure differential between said chamber and the atmosphere for closing the passage through said auxiliary valve means substantially at said predetermined minimum pressure differential.

10. An apparatus as in claim 9, in which a conduit means is connected with the control valve and the auxiliary valve means, and also is in communication with the chamber by a larger port and a smaller port, said apparatus also including a valve responsive to the pressure in said chamber for closing said larger port when the pressure differential between said chamber and the atmosphere substantially attains said minimum pressure differential, whereby the control valve and the smaller port only are effective for controlling the flow of fluid when the pressure differential exceeds said minimum.

11. A servomotor brake apparatus for a vehicle having brake elements which normally are disengaged from one another, and means for effecting the initial engagement of the brake elements and the establishment of braking effects thereat, comprising an expansible chamber device with two members moved relative to one another as the chamber volume varies, one said member being fixed and the other member connected to the said brake means, a control valve for controlling the flow of fluid into and out of the chamber and including a part moved with the said other member, means for moving another part of the control valve relative to said one part, and quick-take-up devices associated with said control valve and chamber device for producing a rapid initial change of the chamber volume to effect a quick initial engagement of the brake elements, said quick-take-up devices including means for reducing the cross-section of passage for fluid relative to said expansible chamber device following the quick initial engagement.

12. A servomotor brake apparatus as a claim 11, in which said latter devices include a by-pass around said control valve and means responsive to the pressure in said chamber for closing said by-pass at a predetermined maximum pressure in said chamber.

13. A servomotor brake apparatus for applying a brake element which is normally spaced from a cooperative brake element, comprising an expansible chamber device with two members moved relative to one another as the chamber volume varies; a control valve for controlling the flow of fluid into and out of the chamber; means for effecting said flow of fluid; conduit means between said flow effecting means, said valve and the chamber, said conduit means including a tube along which one said member moves, said tube having a port along its length to provide a port for communication between the chamber and the interior of the tube, said one member being effective in its movement to shut off said port to an extent determined by the amount of said movement; means actuated by said one member for effecting engagement of the brake elements and the establishment of braking effects therebetween; and means whereby said one member is effective to move said control valve, said latter moving means including a lost motion connection whereby the cooperating brake members may be engaged before the control valve is moved by said one member.

14. A servomotor brake apparatus comprising an expansible chamber device with two members moved relative to one another as the chamber volume varies, a brake member and means associated therewith for applying a brake, a valve actuating member, means for causing the brake and valve actuating members to move together and including a lost motion connection whereby the valve actuating member may be given an initial movement independently of the brake member, said expansible chamber device being connected for moving said brake member, means separate from said control valve for regulating said flow of fluid and including a conduit attached to one said member and having a port and also including means connected with the other member for selectively varying the cross-section of said port as the members move relative to one another, a control valve for controlling the flow of fluid into and out of the chamber, and means for operatively connecting the valve actuating member and the control valve.

15. A servomotor brake apparatus as in claim 14, in which the control valve includes a part connected for movement with the brake member and another part connected for movement with said valve actuating member.

16. A servomotor brake apparatus comprising an expansible chamber device with two members moved relative to one another as the chamber volume varies; control valve means for controlling the flow of fluid into and out of the chamber, said valve means including a body and a slidable member, said slidable member including a conical portion and cylindrical portions, said valve body having a conduit connection to an evacuating means and a conduit connection to the said chamber, the conical portion of said valve body permitting communication between said conduit connections at a rate determined by the relative position of the valve body and sliding member, and the cylindrical portions being effective for cutting off such communication, said cylindrical portions having passage means by which a by-pass communication may be established between said conduit connections, an automatic valve responsive to the pressure differentials in said conduit connections relative to the atmosphere for closing off said by-pass at a predetermined maximum pressure, a first spring for moving said sliding member relative to the body into a normal position in which the conical portion is ineffective for establishing flow, a second spring which is normally free of the sliding member, said first spring and sliding member being constructed and arranged for effective interengagement substantially at the moment that the conical portion becomes effective for effecting flow between said conduit connections; means for moving said sliding member to determine the braking effect to be produced, and means actuated by the relative movement of said expansible chamber member for producing the braking effect.

17. A servomotor brake apparatus for a vehicle having an evacuating device and a plurality of braking devices, comprising a bellows device having two heads, one said head being universally movable toward and from the other and the other said head being held in fixed position, a control valve for controlling the flow of fluid between the chamber and the evacuating device and between the chamber and the atmosphere, a valve member connected to said universally movable head and actuated thereby to provide a cross-sectional area for fluid flow varying directly with the volume of the chamber formed by the bellows, and a plurality of mechanical connection at spaced points of the universally movable head and each connected for moving a braking device.

18. A servomotor brake apparatus for a vehicle having an evacuating device and a plurality of braking devices, comprising an expansible chamber device with two members moved relative to one another as the chamber volume varies, one said member having a connection for actuating the braking devices and the other said member being connected to the vehicle frame, a control valve including ports for establishing communication of the chamber with the evacuating device and with the atmosphere, said control valve also including relatively movable parts for coordinately and oppositely varying the effective areas of said ports whereby to determine the rate of flow into and from said chamber, and means controlled by said one member for determining the relative positions of said parts and to be effective for regulating and determining the pressure in said chamber device.

FREDERICK L. SHELOR.